United States Patent [19]

Feldkamp et al.

[11] Patent Number: 5,502,342
[45] Date of Patent: Mar. 26, 1996

[54] MACHINE HAVING DEVICES TO REDUCE TRANSMISSIONS OF STRUCTURE-BORNE NOISE

[75] Inventors: Bernward Feldkamp, Winkeling; Bernd Schlieperskötter, Neunkirchen-Seelscheid, both of Germany

[73] Assignee: Klöckner-Humboldt-Deutz AG, Cologne, Germany

[21] Appl. No.: 202,780

[22] Filed: Feb. 28, 1994

[30] Foreign Application Priority Data

May 11, 1993 [DE] Germany .................. 43 15 694.0

[51] Int. Cl.⁶ .................. F16M 1/04; H02K 5/24
[52] U.S. Cl. .................. 310/51; 310/91; 248/638
[58] Field of Search .................. 310/51, 91; 248/638, 248/676

[56] References Cited

U.S. PATENT DOCUMENTS 5,277,395  1/1994  Smith et al. .................. 248/679

FOREIGN PATENT DOCUMENTS 0000647  1/1983  Japan .................. 248/638

*Primary Examiner*—Steven L. Stephan
*Assistant Examiner*—Judson H. Jones
*Attorney, Agent, or Firm*—Charles L. Schwab; Hardaway Law Firm

[57] ABSTRACT

In the fastening of noise-generating machines, particularly centrifuges, the noise in the form of structure-borne noise is often transmitted to other parts of the plant. In order to largely to prevent this, separating joints (16, 17) filled with structure-borne noise deadening material are placed between the fastening parts (14, 15) and the section beams (11, 11') to which the centrifuge with its housing is fastened.

7 Claims, 2 Drawing Sheets

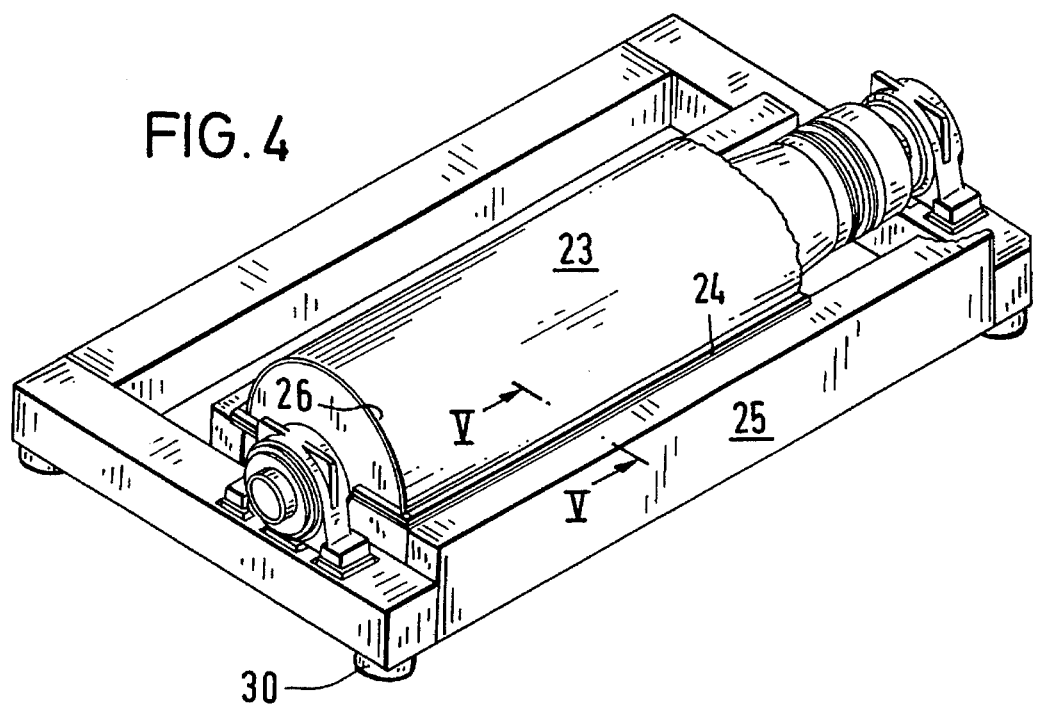
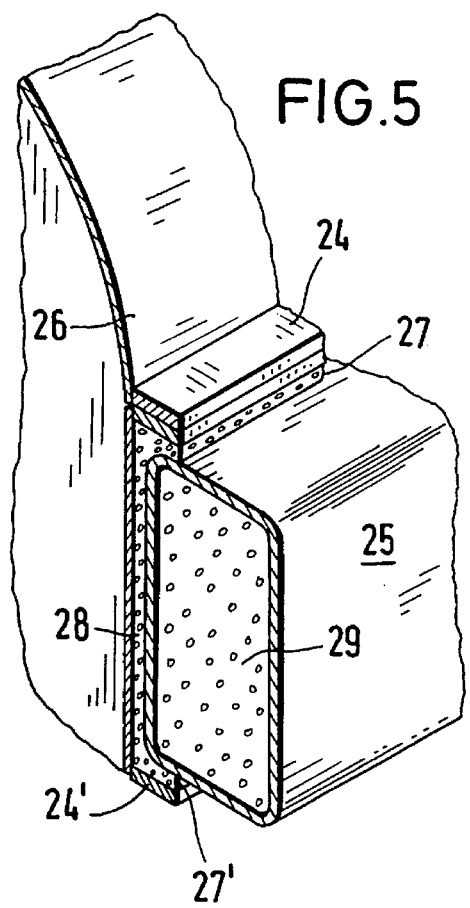

5,502,342

MACHINE HAVING DEVICES TO REDUCE TRANSMISSIONS OF STRUCTURE-BORNE NOISE

TECHNICAL FIELD

This invention relates to a machine, in particular centrifuge, having devices to reduce transmissions of structure-borne noise, having a machine rotor, a machine housing and a base frame formed from section beams to which the machine is detachably connected by means of fastening means.

BACKGROUND OF THE INVENTION

Mechanical vibrations in solid bodies having frequency components in the audible range (16 to 16,000 Hz) are designated as structure-borne noise. The structure-borne noise generated in the machine (noise source) is transmitted from the external surfaces of the machine to the surrounding air and thus emitted as airborne noise. Machines having high power (for example, high rotation speed) often generate noises that lie in the range in which human hearing is endangered. There exists, accordingly, the task—also in consideration of legislative requirements—of keeping the noises generated by the machine, and thus the structure-borne noise, as low as possible.

A known measure consists in enclosing the machine generating structure-borne noise. Even from the enclosed machine, however, vibrations (structure-borne noise) can be transmitted to the foundation and then emitted from there as airborne noise.

A further known measure often used to prevent the propagation of structure-borne noise is an elastic mounting of the machine with the aid of spring means (rubber, steel springs), which are arranged between the machine and the machine foundation. Or, however, the machine is rigidly attached to its foundation, for example a base frame made of section beams, and the foundation or the base frame is springingly supported.

It is furthermore known, instead of an elastic or spring support of the foundation, to mount the foundation on a damping floor, for example dry sand, and thus restrict a propagation of the structure-borne noise beyond the foundation. As is proposed in the Z-VDI guideline document titled "Noise Protection through Enclosure," VDI 2711, the machine foundation and the machine can furthermore be elastically supported (dual elastic supporting). The method proposed in this guideline has, however, the disadvantage of costly and complicated construction. Above all, however, this known method has the disadvantage that, in case of imbalances occurring during operation of the machine—in particular in the case of centrifuges—the excursions of the machine can become so large that proper operation of the machine is no longer insured.

OBJECTS AND SUMMARY OF THE INVENTION

It is an object of the invention to make a machine of the stated type in such fashion that the structure-borne noise generated by the machine is largely restricted in its propagation via the foundation or via the base frame of the machine.

Disconnecting of the machine generating structure-borne noise from the section beams forming the base frame, is achieved by use of separating joints between the machine and the section beams. The separating joint is filled with a structure-borne noise deadening material which results in the structure-borne noise waves generated by the machine being substantially blocked from transmission to the section beams.

It is also desirable to fill the section beams, at least in the fastening region, with the material capable of deadening structure-borne noise, in order further to damp the residual structure-borne noise waves still transmitted via the separating joint, which are already greatly reduced in intensity.

In order to improve the stability of the connection, it is advantageous to embed parts of the fastening means in the material used for deadening the structure-borne noise, the embedded part being, in accordance with the invention, made in anchor shape, in order to prevent a loosening of the fastening means as a consequence of the dynamic loads originating from the machine.

Preferably, the fastening means are divided into two parts. The upper part, which is rigidly connected to the machine, is detachably connected by means of bolts or set screws to the lower part, which is connected to the section beam via the material capable of deadening structure-borne noise. In this fashion, it is also possible to retrofit even older machines with this structure-borne noise deadening fastener, the already present upper part of the fastening means of the machine being utilized for the connection with the likewise already present base frame.

The structure-borne noise deadening material, with which the separating joints as well as the section beams are filled, the latter at least partially, is a concrete, preferably a mineral casting material that preserves its volume during its setting and hardening, that is, does not shrink, and is so strong in compression that it bears the weight of the machine and, despite the dynamic loads originating from the machine, effects a permanent locking of the parts of the fastening means embedded in the mineral casting material.

BRIEF DESCRIPTION OF THE DRAWINGS

Further details and features of the invention are explained in more detail for exemplary embodiments on the basis of the Drawings.

FIG. 4 is a perspective view looking down on a centrifuge similar to FIG. 1 but having a continuous fastening of the centrifuge housing.

FIG. 5 shows a section through the continuous fastening of the centrifuge housing along the line V—V of FIG. 4.

DETAILED DESCRIPTION OF THE DRAWINGS

Figure 1:
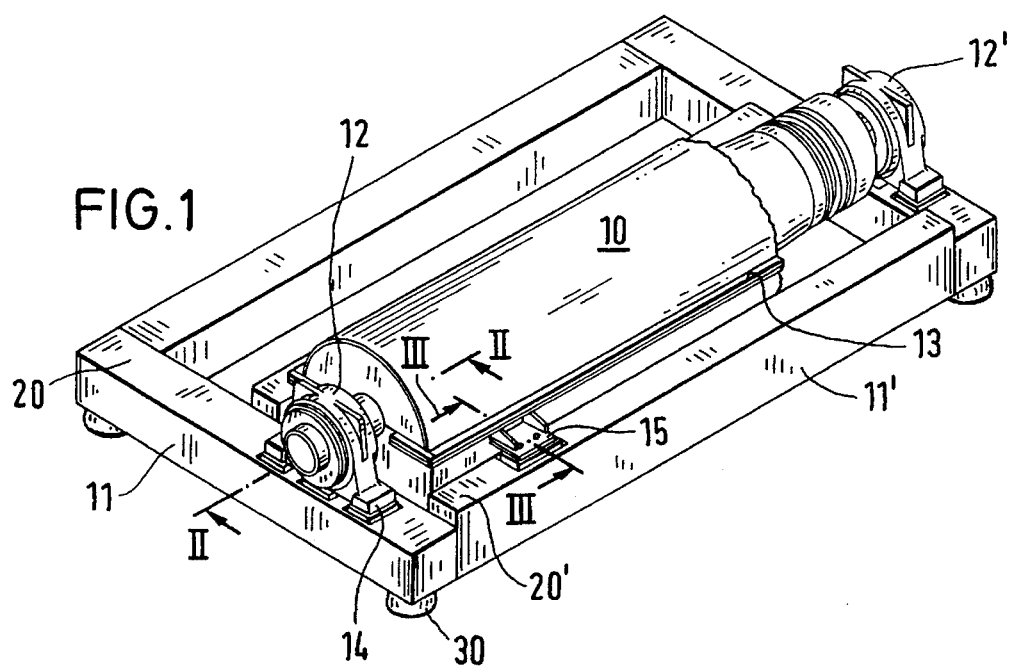
FIG. 1 is a perspective view looking down on a centrifuge enclosed in a housing and having a base frame made of section beams.

FIG. 1 shows a centrifuge (10) generating structure-borne noise, on a base frame formed by box or hollow section beams (11, 11'), which base frame is supported on rubber buffers (30). The centrifuge rotor is attached at its ends, with its pedestal bearings (12, 12'), and the centrifuge housing (13) is laterally attached, to the base frame made of section beams (11, 11') by a plurality of fastening means 15, only one of which is shown in the drawing.

Figure 2:
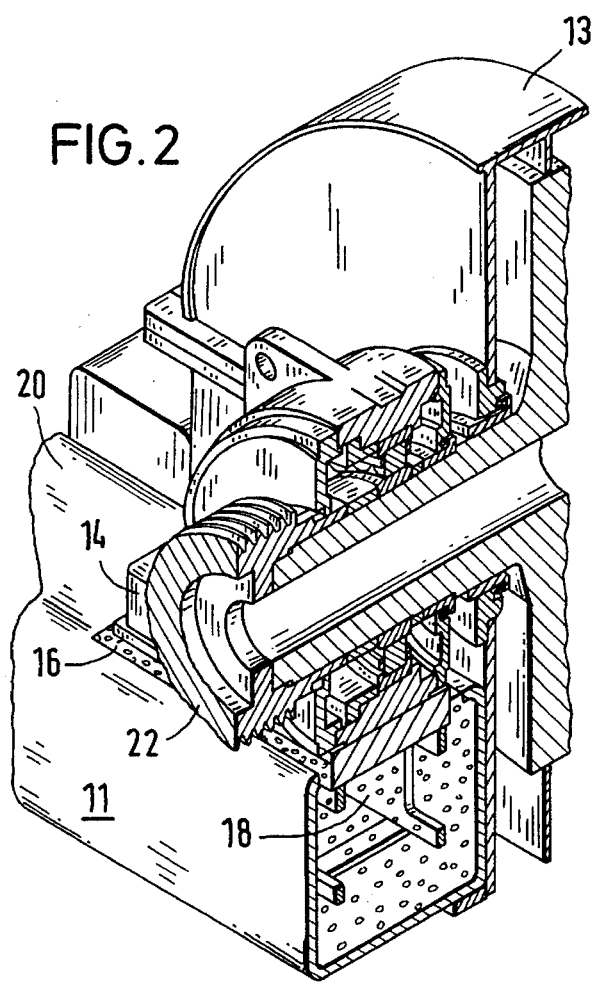
FIG. 2 shows a section through the fastening of the pedestal bearing along the line II—II of FIG. 1.
Figure 3:
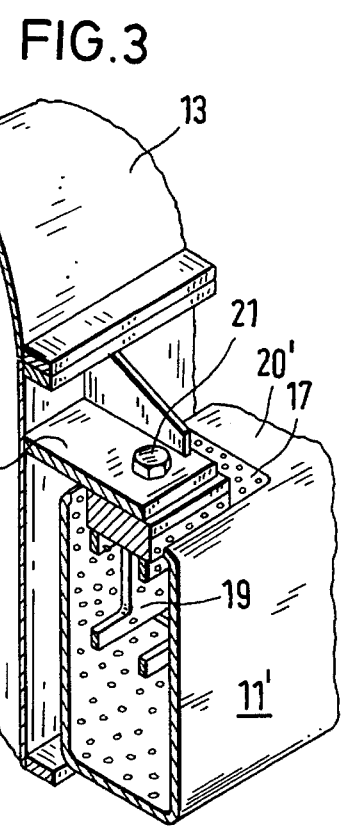
FIG. 3 shows a section through the lateral fastening of the centrifuge housing along the line III—III of FIG. 1.

As shown in FIG. 1 and, in more detail, in FIGS. 2 and 3, the upper surface (20, 20') of the box-shaped section beam (11, 11') in the fastening region has been removed to the extent that separating joints (16, 17) are made between the downwardly extending anchor parts (18, 19) of the fastening means and the edge of the resulting opening in the upper surface (20, 20'). The anchor parts (18, 19) of the fastening means are embedded in the interior of the box-shaped section beam (11, 11'), now accessible from above. By filling the resulting cavities with structure-borne noise deadening material, for example mineral casting material, the anchor parts (18, 19) are completely enveloped or embedded and the separating joints (16, 17) are filled. The anchor-shape of the fastening means (18, 19), in combination with the mineral casting material enclosing them, provides a dimensionally stable anchoring of the fastening means (18, 19), which anchoring does not loosen even in the case of intense vibrations. The upper parts of the fastening means (14, 15) are detachably connected, for example by means of bolts or capscrews (21), to the lower parts of the fastening means (18, 19), which are fixed in place by means of the mineral casting material (in FIG. 2, the capscrews are concealed by the shaft (22)).

A further possibility for reducing the transmission of structure-borne noise in the case of a centrifuge is illustrated in FIG. 4. In this exemplary embodiment, the fastening means (24, 24') connected to the centrifuge housing (26) partially enclose or envelope the box-shaped section beam (25) over the full length of the housing. Horizontal separating joints (27, 27') and a vertical separating joint (28) are thus formed, which joints are filled with the mineral casting material which deadens structure-borne noise and thus constitute a positive, supporting connection between the centrifuge housing (26) and the section beam (25).

For further deadening of structure-borne noise, the box-shaped section beam (25) is also filled, over its entire length, with the structure-borne noise deadening material.

The illustrated exemplary embodiments of the structure-borne noise deadening fasteners can each be employed alone or in combination for the deadening of structure-borne noise, their use not being restricted to centrifuges because they can also be employed in other machines generating structure-borne noise that are fastened to foundations or base frames in a similar fashion.

What is claimed is:

1. A machine comprising, in combination:
   a machine rotor,
   a housing for said rotor,
   a base frame formed from section beams (11, 11', 25).
   fastening means (14, 15) detachably connecting said machine to said beams and
   separating joints (16, 17, 27, 27', 28) between said fastening means (14, 15) and said section beams (11, 11', 25), said separating joints and said section beams in the region of said fastening means being filled with material strong in compression and capable of deadening structure-borne noise,
   said fastening means being at least partially embedded in said structure-borne noise deadening material.

2. The machine of claim 1, wherein said fastening means include an anchor shaped lower end which is embedded in said material in said section beam.

3. The machine of claim 1 wherein said structure-borne noise deadening material is a concrete that does not shrink during its setting and hardening.

4. The machine of claim 3 wherein said concrete is a mineral casting material.

5. The machine of claim 1 wherein said machine is a centrifuge

6. A machine comprising, in combination:
   a machine rotor,
   a housing for said rotor
   a base frame formed from section beams (25,) of box section,
   fastening means (24, 24') connecting said machine to said beams and
   separating joints (27, 27', 28) between said fastening means (24, 24') and said section beams (25), said separating joints and said section beams in the region of said fastening means being filled with a material strong in compression and capable of deadening structure-borne noise
   said fastening means (24, 24') partially enveloping said box shaped section beams (25) over substantially the length of said machine housing (26).

7. A machine comprising in combination:
   a machine rotor,
   a housing for said rotor,
   a base frame formed from section beams (11, 11', 25),
   fastening means detachably connecting said machine to said beams and
   separating joints (16, 17, 27, 27', 28) between said fastening means and said section beams (11, 11', 25),
   said separating joints and said section beams in the region of said fastening means being filled with a structure-borne noise deadening material in the form of concrete whereby structural borne noise transmitted by said machine to said section beams by way of said fastening means passes through said concrete.

* * * * *